US010544536B2

(12) United States Patent
Zattin et al.

(10) Patent No.: US 10,544,536 B2
(45) Date of Patent: Jan. 28, 2020

(54) LAUNDRY WASHING MACHINE AND METHOD FOR CONTROLLING A LAUNDRY WASHING MACHINE

(71) Applicant: Electrolux Appliances Aktiebolag, Stockholm (SE)

(72) Inventors: Andrea Zattin, Solesino (IT); Elisa Stabon, Gorizia (IT)

(73) Assignee: Electrolux Appliances Aktiebolag (SE)

( * ) Notice: Subject to any disclaimer, the term of this patent is extended or adjusted under 35 U.S.C. 154(b) by 600 days.

(21) Appl. No.: 15/108,814

(22) PCT Filed: Dec. 30, 2013

(86) PCT No.: PCT/EP2013/078133
§ 371 (c)(1),
(2) Date: Jun. 29, 2016

(87) PCT Pub. No.: WO2015/101389
PCT Pub. Date: Jul. 9, 2015

(65) Prior Publication Data
US 2016/0333514 A1 Nov. 17, 2016

(51) Int. Cl.
*D06F 39/04* (2006.01)
*D06F 39/00* (2006.01)
(Continued)

(52) U.S. Cl.
CPC .......... *D06F 39/045* (2013.01); *C02F 1/42* (2013.01); *D06F 33/02* (2013.01); *D06F 35/006* (2013.01);
(Continued)

(58) Field of Classification Search
None
See application file for complete search history.

(56) References Cited

U.S. PATENT DOCUMENTS 5,167,722 A 12/1992 Pastryk et al.
5,272,892 A 12/1993 Janutka et al.
(Continued)

FOREIGN PATENT DOCUMENTS

CH 104603 A2 7/2012
DE 3519831 A1 * 12/1986
(Continued)

OTHER PUBLICATIONS

Translation of DE102013206359, dated Oct. 2014.*
(Continued)

*Primary Examiner* — Michael E Barr
*Assistant Examiner* — Jason P Riggleman
(74) *Attorney, Agent, or Firm* — RatnerPrestia

(57) ABSTRACT

Laundry washing machine (1) has an outer casing (2), a washing tub (3), arranged inside the casing (2), and a rotatable drum (4), arranged in axially rotating manner inside the washing tub (3) and designed to receive laundry to be washed The machine also has a detergent dispensing assembly (12), designed for supplying detergent/water into the washing tub (3), a water softening system (14), designed to receive fresh water from a water mains (13) and configured to reduce the hardness degree of the fresh water in order to supply softened water to the detergent dispensing assembly (12) and/or to the washing tub (3) during one or more softened water laundry wash phases. The machine also has a heating device (11) to heat the water loaded in the washing tub (3) so as to regulate the temperature of the loaded water, a control panel (28) configured to allow the operator to input information indicative of a washing course to be performed, wherein the washing course has one or more softened water laundry wash phases, and a controller (15) configured to control the heating device (11) to regulate the temperature of
(Continued)

the water loaded in the washing tub (3) based on the softened water laundry wash phase/s of the laundry washing course.

26 Claims, 6 Drawing Sheets

(51) Int. Cl.
*D06F 33/02* (2006.01)
*C02F 1/42* (2006.01)
*D06F 35/00* (2006.01)
*D06F 37/04* (2006.01)
*D06F 39/02* (2006.01)
*G05B 19/042* (2006.01)
*G05G 1/08* (2006.01)
*C02F 101/10* (2006.01)

(52) U.S. Cl.
CPC ............ *D06F 37/04* (2013.01); *D06F 39/007* (2013.01); *D06F 39/02* (2013.01); *D06F 39/028* (2013.01); *G05B 19/0426* (2013.01); *G05G 1/08* (2013.01); *C02F 2101/10* (2013.01); *C02F 2303/22* (2013.01); *C02F 2307/12* (2013.01); *G05B 2219/2633* (2013.01)

(56) References Cited

U.S. PATENT DOCUMENTS

| | | | |
|---|---|---|---|
| 6,169,964 | B1 | 1/2001 | Aisa et al. |
| 6,557,382 | B1* | 5/2003 | Koike ............... D06F 39/007 68/13 A |
| 2005/0103631 | A1 | 5/2005 | Freydina et al. |
| 2005/0252538 | A1 | 11/2005 | Vernon et al. |
| 2007/0028397 | A1 | 2/2007 | Park et al. |
| 2008/0000272 | A1 | 1/2008 | Park et al. |
| 2009/0114598 | A1 | 5/2009 | van Kralingen et al. |
| 2010/0287709 | A1* | 11/2010 | Doyle ................ A47L 15/0023 8/137 |
| 2012/0174631 | A1 | 7/2012 | Cho et al. |
| 2012/0180227 | A1* | 7/2012 | Kim ..................... D06F 35/00 8/137 |
| 2012/0203391 | A1 | 8/2012 | Lee |
| 2013/0263387 | A1* | 10/2013 | Aykroyd .............. D06F 33/02 8/137 |
| 2015/0368848 | A1 | 12/2015 | Del Pos et al. |

FOREIGN PATENT DOCUMENTS

| | | |
|---|---|---|
| DE | 19940162 A1 | 3/2001 |
| DE | 102005049078 A1 | 4/2007 |
| DE | 102010028445 A1 | 11/2011 |
| DE | 102013206359 * | 10/2014 |
| EA | 0749720 A1 | 12/1996 |
| EP | 0467028 A1 | 1/1992 |
| EP | 0861114 A1 | 9/1998 |
| EP | 1085118 A2 | 3/2001 |
| EP | 2486180 B1 | 8/2012 |
| EP | 2565319 A1 | 3/2013 |
| EP | 2657387 A1 | 10/2013 |
| GB | 1442616 A | 7/1976 |
| JP | 2001017775 A | 1/2001 |
| WO | 2006079417 A1 | 8/2006 |
| WO | 2007108645 A1 | 9/2007 |
| WO | 2009066940 A2 | 5/2009 |
| WO | 2011042341 A1 | 4/2011 |
| WO | 2011080241 A1 | 7/2011 |

OTHER PUBLICATIONS

Translation of DE3519831A1, dated Dec. 1986.*
Non Final Office Action for U.S. Appl. No. 15/108,816, dated Jul. 2, 2018, 21 pages.
Non Final Office Action for U.S. Appl. No. 15/108,815, dated Dec. 14, 2018, 32 pages.
Non Final Office Action for U.S. Appl. No. 15/108,895, dated Nov. 28, 2018, 15 pages.
Australian Examination Report for Australian Application No. 2013409579, dated Feb. 4, 2019, 4 pages.
Final Office Action for U.S. Appl. No. 15/108,895, dated Mar. 21, 2019, 7 pages.
Final Office Action for U.S. Appl. No. 15/108,815, dated Mar. 21, 2019, 18 pages.
Final Office Action for U.S. Appl. No. 15/108,816, dated Oct. 11, 2018, 17 pages.
Non Final Office Action for U.S. Appl. No. 15/108,816, dated Feb. 21, 2019, 17 pages.
International Search Report in corresponding International Application No. PCT/EP2013/078133 dated Mar. 25, 2014.
International Search Report in related International Application No. PCT/EP2013/078135, dated Oct. 6, 2014.
International Search Report issued in related International Application No. PCT/EP2013/078134, dated Jul. 28, 2014.
International Search Report in corresponding International Application No. PCT/EP2014/064414 dated Sep. 17, 2014.
International Search Report in corresponding International Application No. PCT/EP2014/064413 dated Sep. 17, 2014.
Non Final Office Action for U.S. Appl. No. 15/108,985, dated Jun. 14, 2019, 9 pages.
Notice of Allowance for U.S. Appl. No. 15/108,895, dated Jun. 4, 2019, 7 pages.
Notice of Allowance for U.S. Appl. No. 15/108,816, dated Jul. 17, 2019, 14 pages.
Notice of Allowance for U.S. Appl. No. 15/108,985, dated Oct. 9, 2019, 10 pages.

* cited by examiner

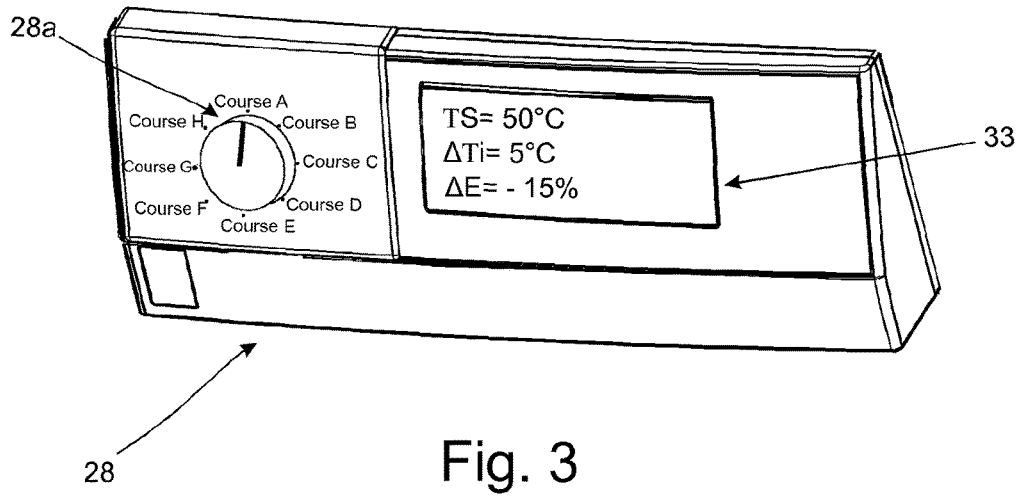

Fig. 3

| washing course User selection | Main Wash phase | Secondary laundry wash phases | | | | | TSi | ΔTi | ΔEi | Cold Water |
|---|---|---|---|---|---|---|---|---|---|---|
| | | First Rinse | Second Rinse | .... Rinse | .... Rinse | Last Rinse | | | | |
| Energy saving washing course A | Soft. Water | Fresh Water | Fresh Water | Fresh Water | Fresh Water | Fresh Water | TS1 | ΔT1 | ΔE1 | Not |
| Energy saving washing course B | Soft. Water | Mix. Water | Fresh Water | Fresh Water | Fresh Water | Fresh Water | TS2 | ΔT2 | ΔE2 | Not |
| Energy saving washing course C | Soft. Water | Mix. Water | Mix. Water | Fresh Water | Fresh Water | Fresh Water | TS3 | ΔT3 | ΔE3 | Not |
| Energy saving washing course D | Soft. Water | Mix. Water | Mix. Water | Mix. Water | Fresh Water | Fresh Water | TS4 | ΔT4 | ΔE4 | Not |
| | | | | | | | | | | |
| Energy saving washing course N-1 | Soft. Water | Soft. Water | Soft. Water | Soft. Water | Soft. Water | Mix. Water | TSN-1 | ΔTN-1 | ΔEN-1 | Not |
| Energy saving washing course N | Soft. Water | Soft. Water | Soft. Water | Soft. Water | Soft. Water | Soft. Water | TSN | ΔTN | ΔEN | Not |
| Energy saving washing course N+1 | Soft. Water | Soft. Water | Soft. Water | Soft. Water | Soft. Water | Soft. Water | TSN+1 | ΔTN+1 | ΔEN+1 | YES |

Fig. 4

LAUNDRY WASHING MACHINE AND METHOD FOR CONTROLLING A LAUNDRY WASHING MACHINE

FIELD

The present invention concerns the field of laundry washing techniques.

In particular, the present invention refers to a laundry washing machine and a method for controlling a laundry washing machine provided with a water softening device. More particularly, to a front-loading home laundry washing machine, to which the following description refers purely by way of example without this implying any loss of generality.

BACKGROUND

Nowadays the use of laundry treatment appliances, such as laundry washing machines, i.e. laundry washing machines which wash and rinse laundry, or laundry washing and drying machines, i.e. laundry washing machines which can also dry laundry, is widespread. In this respect, in the present description, where not stated differently, the term "laundry washing machine" can be referred to a laundry washing machine, or a laundry washing and drying machines.

Laundry washing machines generally comprise an external casing provided with a washing tub which comprises a rotatable perforated drum where the laundry is placed, an electric motor which rotates the drum in the washing tub, a water-detergent supplying system which supplies fresh water and/or cleaning agents, i.e. detergent, into the washing tub/drum, and a water draining system which discharges/drains wash water/detergent from the washing tub.

A typical laundry washing course performed by laundry washing machines comprises various sequential laundry treating phases such as a main laundry wash phase, and a prefixed number of laundry rinse phases.

More specifically, during the main wash phase, the water-detergent supplying system adds fresh water and detergent into the washing tub until a prefixed water level is reached such that a cleaning solution is formed in the tub. Moreover, during the main wash phase, electrical heating means, i.e. an electrical resistor typically arranged in the bottom of the washing tub, are switched on to heat the loaded water in order to cause the washing temperature of the loaded water to reach a predetermined washing temperature based on the selected laundry washing course. To raise the temperature of the loaded water during the main laundry wash phase, it is therefore necessary to supply a high electric power to the electrical resistor that however heavily affects the whole electricity consumption of the laundry washing machine. For example, in the current laundry washing machine, to wash 4.5 kg of laundry it is required an electric power of 1.0 Kw to heat 16 liters of the washing water in order to increase the water temperature from 20 C to 60° C.

Recently, to prevent global warming, it is required to perform energy saving in the operation of electric machine/devices. In this respect, it is necessary to reduce the electricity consumption of the laundry washing machine and, in particular, decreasing the amount of electricity consumption of the electrical heating means needed for heating the washing water during the main laundry wash phase.

The Applicant has conducted an in-depth study with the objective of identifying a solution which specifically performs an energy saving during the main wash phase, without however affecting the laundry washing performances.

It is thus the object of the present invention to provide a solution which allows achieving the objective indicated above.

SUMMARY OF SELECTED INVENTIVE ASPECTS

According to aspects of the present invention, there is provided a laundry washing machine comprising: an outer casing, a washing tub, which is arranged inside the casing, a rotatable drum, which is arranged in axially rotating manner inside the washing tub and is designed to receive laundry to be washed, a detergent dispensing assembly, which is designed for supplying detergent/water into the washing tub, a water softening system, which is designed to receive fresh water from a water mains and is configured to reduce the hardness degree of the fresh water in order to supply softened water to the detergent dispensing assembly and/or to the washing tub during one or more softened water laundry wash phases, heating means designed to heat the water loaded in the washing tub so as to regulate the temperature of the loaded water, a control panel configured to allow operator to input information indicative of a washing course to be performed, wherein the washing course comprises one or more softened water laundry wash phases, and a controller configured to control said heating means to regulate the temperature of the water loaded in the washing tub based on the softened water laundry wash phase/s of said laundry washing course.

Preferably, said laundry washing course further comprises one or more fresh water laundry wash phase/s, wherein fresh water is supplied to detergent dispensing assembly and/or to the washing tub; the controller being configured to control said heating means to regulate the temperature of the water loaded in the washing tub based on the softened water laundry wash phase/s and the fresh water laundry wash phase/s of the laundry washing course.

Preferably, said laundry washing course further comprises one or more mix water laundry wash phase/s, wherein a mixture of fresh water and softened water is supplied to detergent dispensing assembly and/or to the washing tub; said controller being configured to control said heating means to regulate the temperature of the water loaded in the washing tub based on the softened water laundry wash phase/s and the mix water laundry wash phase/s of the laundry washing course to be performed.

Preferably, said controller is configured to control said heating means to regulate the temperature of the water loaded in the washing tub based on the softened water laundry wash phase/s, the mix water laundry wash phase/s, and the fresh water wash phase/s of said laundry washing course to be performed.

Preferably, washing course comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

Preferably, said main laundry wash phase comprises at least a wetting phase, a maintenance phase and a drain phase; said secondary laundry wash phases comprising one or more rinse phases performed after said drain phase of the main laundry wash phase is finished.

Preferably, the main laundry wash phase comprises: a wetting phase (step of loading water and detergent into the washing tub), a maintenance phase (step of tumbling the laundry for detergent action), a drain phase (step of draining water), and preferably, although not necessarily, a spin phase (step of spinning the drum).

Preferably, if the course to be performed uses heated water, the main laundry wash phase can further comprise a heating phase (step of switching-on the heating device 11) which is performed after the wetting phase and preferably before the maintenance phase.

Preferably, the drain phase is the last phase of the main laundry wash phase, and is performed before executing the first rinse phase of the secondary laundry wash phases following the main laundry wash phase.

Preferably, the rinse phases following the main laundry wash phase, may comprise a water loading phase (loading water into the washing tub), a rinse maintenance phase (tumbling the laundry), a drain phase, and preferably a spin phase.

Preferably, said control panel is configured to allow operator to select a washing course among a plurality of predetermined energy saving washing courses, wherein each selectable energy saving washing course comprises one or more softened water laundry wash phase/s.

Preferably, the laundry washing machine comprises memory means containing data relating to one or more energy saving washing courses, said memorized data being indicative of loading of soft water, or fresh water, or mix water to the detergent dispensing assembly and/or the washing tub during laundry washing phases of energy saving washing courses, an energy saving washing temperature and said controller is configured to: selectively activate said water softening system based on the selected energy saving washing course as to supply softened water to the detergent dispensing assembly and/or the washing tub during at least said main laundry wash phase, and control said heating means as to regulate the actual temperature of the supplied water based on the based on said energy saving temperature.

Preferably, the control panel comprises a first select part configured to allow operator to input first information indicative of said laundry washing course; a second select part configured to allow operator to input second information indicative of one or more energy saving commands; the controller is configured to determine/set an energy saving washing course based on received first and second information; said energy saving washing course comprises one or more softened water laundry wash phase/s.

Preferably, said first select part is configured to allow operator to select a laundry washing course among a plurality of fresh water laundry washing courses, a fresh-water laundry washing course comprising only fresh water wash phases and being associated to a predetermined washing temperature; said second select part being configured to allow operator to input said second information indicative of one or more energy saving commands associated to respective energy saving levels; said controller being further configured to set/determine said energy saving laundry washing course based on selected fresh water laundry washing course and said energy saving commands, control said water softening system in response to the set energy saving washing course to supply softened water during at least the main laundry wash phase and/or during one or more of the secondary wash phase/s; and control heating means to cause the actual temperature of the softened water loaded in the washing tub during the main laundry wash phase to reach an energy saving temperature lower than said predetermined temperature of said selected fresh water washing course.

Preferably, controller is configured to determine the energy saving laundry washing course by replacing one or more fresh water wash phases of said selected fresh-water laundry washing course, with respective softened water laundry wash phases and/or mix water laundry wash phases, in response to said energy saving commands.

Preferably, the first select part is configured to allow operator to select a water laundry washing course among a plurality of softened water laundry washing courses; said softened water laundry washing course comprising one or more softened water laundry wash phase and being associated to a predetermined washing temperature; said second select part being configured to allow operator to input said second information indicative of an energy saving command; the controller is configured to set/determine an energy saving laundry washing course based on the selected softened water laundry washing course and said energy saving commands, control said water softening system in response to the set energy saving washing course to supply softened water during at least the main wash phase and/or during one or more of said secondary laundry wash phase/s; and control the heating means to cause the actual temperature of the softened water loaded in the washing tub during the main wash phase to reach an energy saving temperature lower than said predetermined temperature of said selected softened-water laundry washing course.

Preferably, control panel is configured to provide operator with at least one of the following: an indication of said predetermined washing temperature; an indication of the energy saving washing temperature; an indication of the difference between said predetermined washing temperature and said energy saving washing temperature; an indication of the energy saved.

Preferably, electronic sensing means are configured to determine the hardness degree of the water supplied into the washing tub; the controller being configured to control said heating means to regulate the temperature of the water loaded in the washing tub based on said determined hardness degree.

Preferably, the controller is configured to control said water softening system in order to regulate the hardness degree of the softened water based on said determined hardness degree.

Preferably, information are indicative of a energy saving washing course to be performed, wherein the main laundry wash phase of said energy saving washing course does not comprise a heating phase wherein the loaded water is heated; the controller is configured to activate said water softening system in response to said energy saving washing course so as to supply soft water to the detergent dispensing assembly and/or the washing tub during at least said main laundry wash phase, and maintain said heating means switched-off during said main laundry wash phase so that the loaded softened water is not heated.

Preferably, the controller is configured to activate said water softening system in response to said energy saving washing course so as to supply softened water to the detergent dispensing assembly and/or the washing tub during said main laundry wash phase and/or during one or more secondary laundry wash phases, control said heating means to cause the supplied softened water to substantially be/remain cold water.

Preferably, the controller is configured to maintain switched-off said heating means during said main laundry wash phase so that the loaded softened water is not heated.

Preferably said controller is configured to switch-on said heating means during said main laundry wash phase for a prefixed short time to cause the temperature of the loaded softened water to rise few degrees (for example 5° C. or 7° C.) compared to the temperature of fresh water provided by the cold water mains.

Preferably, said controller is configured to switch-on said heating means during said main laundry wash phase for a prefixed time interval or for prefixed time intervals to cause the temperature of the loaded softened water to rise 5° C. or less than 5° C. above the temperature of fresh water provided by said water mains.

For example, when the temperature of the fresh water from the water mains is 18° C., the controller energizes the heating means for prefixed time intervals so that the final temperature of the loaded softened water lies in the range of 18° C.-23° C.

Preferably, softened water has a reduced hardness degree which is lower or equal than about 15 FH. Preferably, softened water has a reduced hardness degree which is lower or equal than about 5 FH. Preferably, softened water has a reduced hardness degree which is lower or equal than about 2 FH. Preferably softened water has a reduced hardness degree which is lower or equal than about 1 FH.

Preferably, mix water has a reduced hardness degree which is greater than, or equal to about 15 FH, and lower than, or equal to about 25 FH.

Preferably the water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

Preferably, an electrically-powered brine-circulating pump is interposed between the water-softening agent container and the regeneration-agent reservoir and is structured for transferring/moving the brine (i.e. the salt water) from the regeneration-agent reservoir to the water-softening agent container when activated.

Preferably, water softening system comprises at least a flow through capacitor comprising plates having a conductive surface, wherein the plates are chargeable in response to an applied voltage to remove ions dissolved in the fresh water.

Aspects of the present invention further relate to a method for controlling a laundry washing machine comprising an outer casing, a washing tub, which is arranged inside the casing, a rotatable drum, which is arranged in axially rotating manner inside the washing tub and is designed to receive laundry to be washed, a detergent dispensing assembly, which is designed for supplying detergent/water into the washing tub, a water softening system, which is designed to receive fresh water from a water mains and is configured to reduce the hardness degree of the fresh water in order to supply softened water to the detergent dispensing assembly and/or to the washing tub during one or more softened water laundry wash phases, heating means designed to heat the water loaded in the washing tub so as to regulate the temperature of the loaded water, and control panel configured to allow operator to input information indicative of a washing course to be performed, wherein the washing course comprises one or more softened water laundry wash phases, the method comprising the step of control said heating means to regulate the temperature of the water loaded in the washing tub based on the softened water laundry wash phase/s of said laundry washing course.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular:

FIG. 3 schematically illustrates a first embodiment of a user control panel of the laundry washing machine illustrated in FIG. 1;

FIG. 4 shows an example of a table containing energy saving washing courses selectable by the control panel illustrated in FIG. 3;

DETAILED DESCRIPTION OF EXAMPLE EMBODIMENTS

Aspects of the present invention have proved to be particularly advantageous when applied to a laundry treatment machine, such as laundry washing machines, as described below. It should be understood that although the control method is described with reference to a laundry washing machine, other applications are contemplated. As can be appreciated, aspects of the present invention can be conveniently applied to other laundry treatment appliances, like for example laundry washing and drying machines (called also washer/driers), wherein one or more steps of introducing water and/or steam and/or hot/cool air inside a laundry tub may be required.

Figure 1:
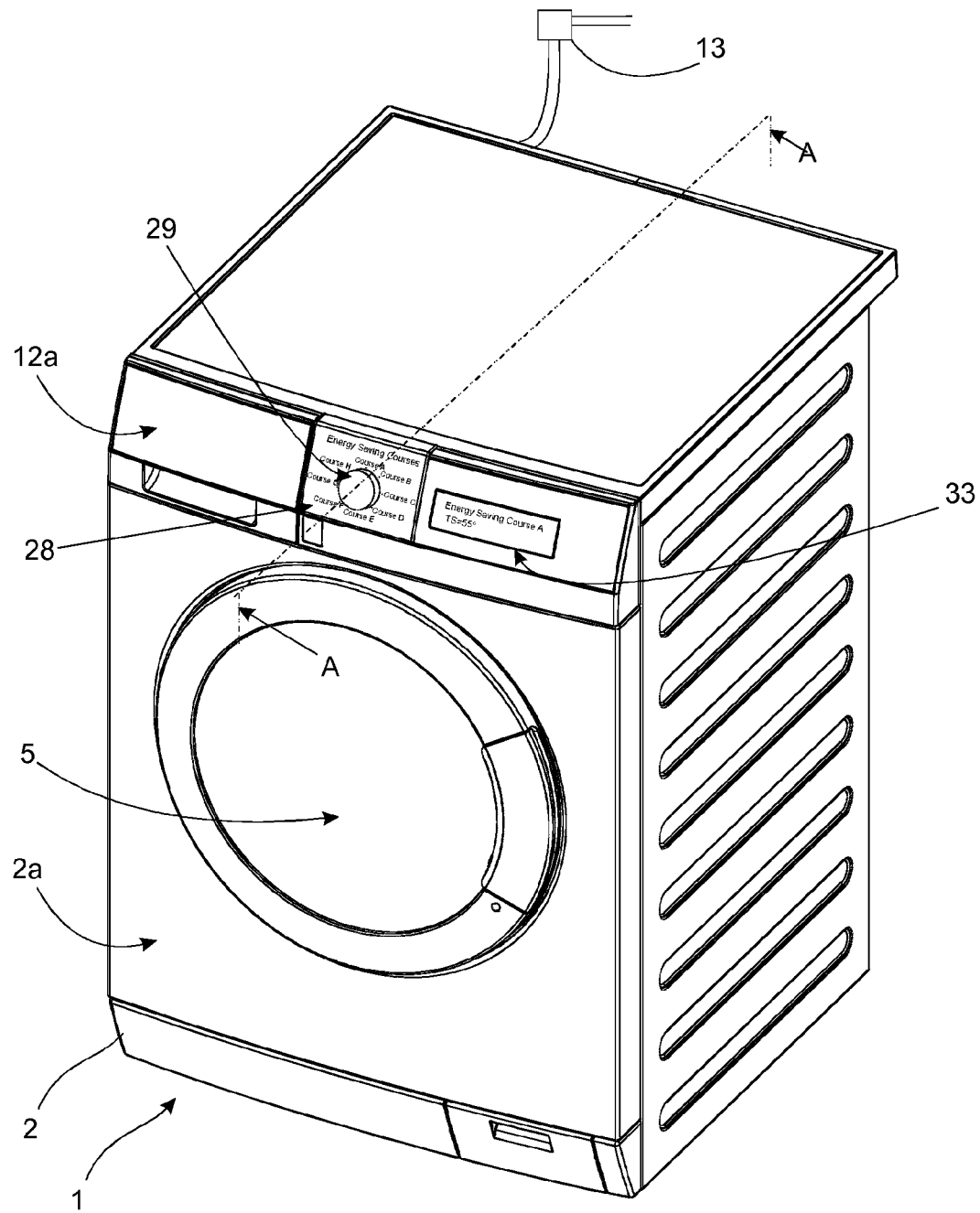
FIG. 1 is a schematic perspective view of a laundry washing machine according to aspects of the present invention.
Figure 2:
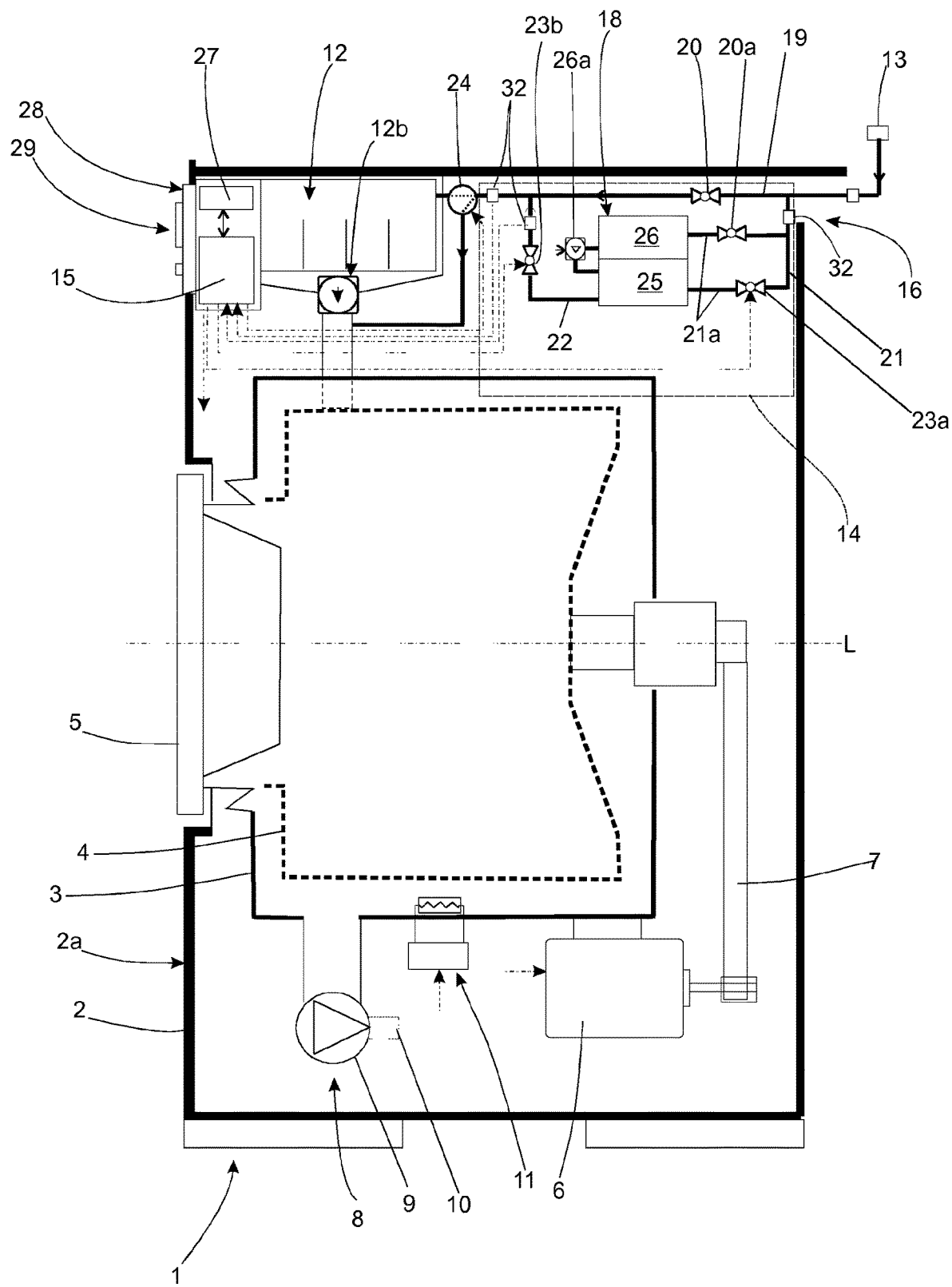
FIG. 2 is a longitudinal cross-sectional schematic view taken along line A-A in FIG. 1, with some parts/components of the machine removed for clarity.

With reference to FIGS. 1 and 2, reference number 1 indicates as a whole a home laundry washing machine which comprises: a preferably, though not necessarily, substantially parallelepiped-shaped, rigid outer boxlike casing 2, which is structured for resting on the floor; a preferably substantially cylindrical, bell-shaped hollow washing tub 3, which is arranged inside the casing 2 with its opening or mouth directly facing a laundry loading/unloading pass-through opening realized in the front wall 2*a* of boxlike casing 2; a preferably substantially cylindrical, elastically-deformable bellows (not shown) watertight connecting the front opening or mouth of washing tub 3 to the laundry loading/unloading opening realized in the front wall 2a of casing 2; and a substantially cylindrical, bell-shaped revolving perforated drum 4 structured for housing the laundry to be washed, and which is housed in axially rotating manner inside the washing tub 3 so as to be able to freely rotate about its longitudinal reference axis preferably, though not necessarily, an horizontal rotation axis. In an alternative embodiment not shown, rotation axis may be vertical or inclined.

According to one embodiment, the revolving drum 4 is housed in axially rotating manner inside the washing tub 3 with its front opening directly faced/aligned to the laundry loading/unloading opening on the front wall 2a of casing 2, and the drum rotation axis is preferably arranged locally substantially coincident with the substantially horizontally-oriented longitudinal reference axis of washing tub 3.

Furthermore in the example shown, the hollow washing tub 3 is preferably suspended in floating manner inside the casing 2 via a suspension system preferably, though not necessarily, comprising a couple of upper coil springs (non illustrated) connecting the upper portion of the washing tub 3 to the top of the boxlike casing 2, and a couple of lower vibration dampers (not illustrated) connecting the bottom portion of the washing tub 3 to the bottom of the boxlike casing 2.

With reference to FIG. 1, the laundry washing machine 1 furthermore comprises a porthole door 5 which is hinged to the front wall 2a of casing 2 to rotate about a preferably, though not necessarily, vertically-oriented reference axis to and from a closing position in which the peripheral border of the porthole door 5 rests completely on front wall for closing the laundry loading/unloading opening and watertight sealing the washing tub 3; and an electrically-powered motor assembly 6 which is structured for driving into rotation the revolving drum 4 about its longitudinal reference axis inside the washing tub 3, by means of a belt/pulley system 7. In a different embodiment of the invention, the motor 6 may be directly associated with the shaft of the revolving drum 4.

With reference to FIG. 2, the laundry washing machine 1 furthermore comprises a water draining system 8 (only partially and schematically illustrated), which is configured to drain the wash water, i.e. dirty water and/or water mixed with washing and/or rinsing products, from the washing tub 3 to the outside. The water draining system 8 may comprise a draining pump 9 (schematically illustrated in FIG. 2), which is fluidly connected to a liquid outlet arranged on the bottom region of the washing tub 3 and is configured to drain the water from the washing tub 3 to supply the drained water into a draining suction pipe 10 (only partially illustrated in broken lines in FIG. 2).

In this instance, the washing tub 3, the drum 4, the suspension system, the electrically-powered motor assembly 6, and the water draining system 8 of the laundry washing machine 1 are well-known elements provided in well-known laundry machine and detailed description thereof will be omitted accordingly.

As shown in FIG. 2, the laundry washing machine 1 furthermore comprises a heating system or heating device 11 configured to heat the water solution loaded in the washing tub 3 to a prefixed temperature. In accordance with one exemplary embodiment, the heating device 11 may comprise one or more electric resistors or any similar/equivalent heating electric/electronic components which are arranged, for example, in the bottom of the washing tub 3 and/or in a sump of the washing tub 3 in order to heat the water loaded in the washing tub 3.

It should be in any case understood that the heating device 11 is not limited to the example described/shown herein. In other words, the heating device 11 is not limited to an electric passive component, such as a resistor or similar, but according to other possible embodiments of the present invention, it may comprise any other equivalent known heating device designed to heat the water in the washing tub 3. For example, in accordance with an exemplary embodiment (not illustrated), the heating device 11 may comprise a steam heating apparatus, or a air heating apparatus, or a microwave apparatus, or a infrared ray apparatus conveniently arranged in the laundry washing machine 1 in order to heat the water loaded, or to be loaded, in the washing tub 3. The steam heating apparatus, the air heating apparatus, the microwave apparatus, and the infrared ray apparatus, are alternative methods or technology to heat up water provided in well-known laundry machine and detailed description thereof will be omitted accordingly.

As shown in FIG. 2, the laundry washing machine 1 furthermore comprises a detergent dispensing assembly 12, which may be housed inside the casing 2 in easily reachable manner by the user, and is structured for selectively feeding into the washing tub 3, a given amount of detergent, softener and/or other washing agent suitably mixed with water based on the selected washing cycle. In one exemplary embodiment, the detergent dispensing assembly 12 may comprise a detergent drawer 12a (illustrated in FIG. 1) which may be fitted/inserted in manually extractable manner into a completely recessed drawer housing (not illustrated), which extends substantially horizontally inside the boxlike casing 2, and is manually movable inside the drawer housing between a working position (illustrated in FIG. 1) and an extracted position (not illustrated). It should be understood that detergent dispensing assembly 12 may be structured for selectively spilling/pouring a given amount of fresh water arriving from a fresh water mains 13 directly into the detergent drawer 12a, so as to flush the detergent, out of the same detergent drawer 12a so that detergent mixed with water is loaded into the washing tub 3.

According to an embodiment the detergent dispensing assembly 12 comprises a single-dose structure which is configured to supply into the washing tub 3 water mixed with a dosage of detergent previously loaded by the user into the detergent drawer 12a.

However, it should be understood that according to a different embodiment, the detergent dispensing assembly 12 may have an auto-dosing structure. I.e. it is provided with an auto-dosing detergent device 12b designed to automatically control the amount of detergent supplied into the washing tub 3. The auto-dosing detergent device 12a may comprise, for example, one or more detergent metering pumps (not illustrated), i.e. volumetric pumps for the metered feed of the detergent mixed with water into the washing tub 3 based on control signals.

Terminology which will be used as follows is hereinafter defined.

More specifically, "FH" is the unit of measurement of water hardness degree corresponding to French degree, wherein 1 fH=10 ppm CaCo3.

With the term fresh water, it will be understood a tap water provided by a water mains 13 usually arranged in a house. It should be understood that water mains 13 generally provides "hard water", i.e. water having a hardness degree greater than about 25 FH (250 ppm CaCo3).

With the term "softened water", it will be understood a water provided by a water softener system which will be disclosed in detail afterwards. In order to be effective for washing process the softened water may have an hardness degree lower than about 15 FH (150 ppm CaCo3), preferably lower than 5 FH (50 ppm CaCo3) and more preferably lower than 2 FH (20 ppm CaCo3).

More preferably, according to a preferred embodiment, softened water may have an hardness degree lower than about 1 FH (10 ppm CaCo3).

With the term mix water, it will be understood a mixture of fresh water and softened water. Preferably, hardness degree of mix water may be comprised between about 15 and about 25 FH.

With "washing course", it will be understood a laundry washing cycle/program comprising a "main laundry wash phase", and one or more "secondary laundry wash phases" following the main laundry wash phase, wherein the secondary laundry wash phases may comprise one or more laundry rinse phase and preferably, although not necessarily, at least one laundry spin phase.

The main laundry wash phase comprises: a wetting phase (step of loading water and detergent into the washing tub), a maintenance phase (step of tumbling the laundry for detergent action), a drain phase (step of draining water), and preferably, although not necessarily, a spin phase (step of spinning the drum).

If the course to be performed uses heated water, the main laundry wash phase can further comprise a heating phase (step of switching-on the heating device 11) which is performed after the wetting phase and preferably before the maintenance phase.

It should be pointed out that drain phase is the last phase of the main laundry wash phase, and is performed before executing the first rinse phase of the secondary laundry wash phases following the main laundry wash phase.

Rinse phases following the main laundry wash phase, may comprise a water loading phase (loading water into the washing tub), a rinse maintenance phase (tumbling the laundry), a drain phase, and preferably a spin phase.

With "softened water laundry wash phase", it will be understood a laundry wash phase wherein softened water is supplied into the washing tub 3.

With "fresh water laundry wash phase" it will be understood a laundry wash phase wherein fresh water is supplied into the washing tub 3.

With "mix water laundry wash phase" it will be understood a laundry wash phase wherein mix water is supplied into the washing tub 3.

With "fresh water laundry washing course", it will be understood a laundry washing course wherein all the wash phases comprise the step of supplying fresh water into the washing tub 3.

With "softened water laundry washing course", it will be understood a laundry washing course wherein the main wash phase comprises the step of supplying softened water, and the secondary laundry wash phases comprise the step of supplying softened or mix or fresh water.

With "energy saving washing course", it will be understood a laundry washing course comprising the steps of supplying softened water during the main wash phase and preferably during one or more secondary laundry wash phases (rinse/spin phases) following the main laundry wash phase so as to perform corresponding "softened water laundry wash phase/s", and control the heating device 11 so that the temperature of the supplied water is regulated on the basis of the supplied softened water, i.e. at least the softened water laundry wash phase/s to perform during the washing course.

As illustrated in FIG. 2, the laundry washing machine 1 comprises a water softener system 14, which is arranged inside the casing 2 between the water mains 13 and the detergent dispensing assembly 12, or between the water mains 13 and directly the washing tub 3, and is designed to reduce the hardness degree of the fresh water so as to provide softened water to the detergent dispensing assembly 12 or directly to the washing tub 3. According to one simplified embodiment, the water softener system 14 may be structured to be activated/controlled so as to operate between a first operating state, wherein it provides softened water, and a second operating state, wherein it provides fresh water. It should be understood however that other kind of water softener systems may be contemplated. As it can be appreciated, aspects of the present invention can be conveniently applied to a water softener system which may be activated/controlled so as to selectively operate, in addition to the first and second operating states above disclosed, further in a third state wherein it provides mix water. According to a simplified embodiment, the water softener system 14 may be designed to vary the hardness degree of the softened water and/or mix water, based on received control/command signals.

With regard to an exemplary embodiment illustrated in FIG. 2, the water softener system 14 may comprise a fresh-water supply circuit 16, which is arranged inside the casing 2 between the water mains 13 and the detergent dispensing assembly 12 or between the water mains 13 and directly the washing tub 3, and may be structured so as to control/regulate the flow of fresh water from the water mains 13 towards the detergent dispensing assembly 12 and/or the washing tub 3. In accordance with the exemplary embodiment illustrated in FIG. 2, the machine 1 may preferably although, not necessarily, comprise an electric-controlled flow diverter device 24 which is connected between the water softener system 14 and the detergent dispensing assembly 12/the washing tub 3, and is designed to receive fresh or softened or mix water from the water softener system 14 and selectively supply, on command, the received water to the detergent dispensing assembly 12 or the washing tub 3. However, it should be understood that according to different embodiments, the water softener system 14 may comprise any other known device/system designed to selectively supply the received water to the detergent dispensing assembly 12 or the washing tub 3.

In accordance with one embodiment, the water softener system 14 further comprise an internal water softening device 18, which may be arranged along the fresh-water supply circuit 16 between the water mains 13 and the detergent dispensing assembly 12, or the flow diverter device 24 if presents, so as to be crossed by the fresh water flowing from the water mains 13 towards the detergent dispensing assembly 12 or directly towards the washing tub 3, and is structured to reduce the hardness degree of the fresh water drawn from the water mains 13 so as to provide the softened water to be channeled to the detergent dispensing assembly 12 or directly to the washing tub 3.

In accordance with one simplified exemplary embodiment shown in FIG. 2, the fresh-water supply circuit 16 may preferably comprise a hosepipe 19 connecting the water mains 13 to the inlet of the detergent dispensing assembly 12 or to the washing tub 3, an electrically-controlled valve 20 which is arranged along the hosepipe 19 and is able to control/regulate the flow of fresh water from the water mains 13 towards the detergent dispensing assembly 12 or to the washing tub 3; a hosepipe 21 connecting the water mains 13 to the inlet of water softening device 18 which in turn has the outlet connected to the hosepipe 19, or directly to the detergent dispensing assembly 12, by means of a hosepipe 22; an electrically-controlled valve 23a, which is arranged along the hosepipe 21 and is designed to control/regulate the flow of fresh water from the water mains 13 towards the inlet of the water softening device 18 based on a control signal in order to cause the water softening device 18 to regulate/reduce the hardness degree of the softened water provided in its outlet; and preferably although not necessarily, an electrically-controlled valve 23b, which may be arranged along the hosepipe 22 and is designed to control/regulate the flow of softened water from the water softening device 18 towards the hosepipe 19. It should be understood that mix water may be provided for example by controlling the electrically-controlled valve 20 and 23b.

The electrically-controlled valves 20 and/or 23a and/or 23b may be on-off electric valves configured to be selectively controlled/activated so as to cause the softened, fresh or mix water to be selectively supplied to the detergent dispensing assembly 12/washing tub 3. It should be understood that electrically-controlled valves 20 and/or 23a and/or 23b may be controlled to selectively regulate the volume (liters) of fresh water crossing the hosepipe 19, and/or crossing the softening device 18 and/or the volume of water that the water softening device 18 provides to the hose 19 in order to mix the fresh water and softened water so as to provide mix water having a determined hardness degree.

The electrically-controlled valves 20 and/or 23a and/or 23b could be controlled so that the hardness degree of the softened or mix water is regulated based on a required value. It should in any case be understood that control of the hardness degree of the water may be not limited to the circuit above disclosed. For example the electrically-controlled valve 20, 23a, 23b may be not limited to on-off electric valves but according to possible different embodiments of the present invention, the electrically-controlled valve 20, 23a, 23b may be proportional valve or other kind of known valve electrically designed to be controlled to regulate a water flow rate.

In accordance with one embodiment shown in FIG. 2, the laundry washing machine 1 may preferably, although not necessarily, comprise an electronic sensing system 32, which may comprise a number of sensor devices arranged along the hosepipes 19, 21, 22 to determine/measure hardness values which are indicative of the hardness degree of: the fresh water provided from the water mains 13 and/or the softened water provided in outlet by the water softening device 18, and/or the fresh/softened/mix water provided by the water softening assembly 18.

In accordance with the exemplary embodiment shown in FIG. 2, the sensor devices may be conductometric sensors arranged along the hosepipes 19, 21, 22 upstream from the detergent dispensing assembly 12.

According to an embodiment shown in FIG. 2, the water softening device 18 may be an ion-removal device type. In accordance with one exemplary embodiment, the water softening device 18 may comprise a water-softening agent container 25, which is filled with a given amount of ion-exchange resins (not shown) capable to restrain the calcium and/or magnesium ions (Ca++ an Mg++) dissolved in the fresh water flowing across the water-softening agent container 25 and is preferably interposed between the hosepipes 21 and 22 to be crossed by the fresh water flowing from the valve 23a and the hosepipe 21. In accordance with one exemplary embodiment, the water softening device 18 may further comprise a regeneration-agent reservoir 26 which to structured for receiving a given amount (for example half a Kilo or one Kilo) of salt grains (Sodium Chloride) and is designed to uses brine (i.e. salt water) to periodically regenerate the ion-exchange resins contained in the water-softening agent container 25. Salt water, in fact, is able to remove from the ion-exchange resins the calcium and magnesium ions previously combined/fixed to the resins.

The internal water softening device 18 may further preferably although not necessarily comprise: a water supply circuit 21a which is structured for selectively channeling, on command, a given amount of fresh water into the water-softening agent container 25 and regeneration-agent reservoir 26 so to at least partly dissolve the salt or other regeneration agents stored therein and form a given amount of brine (i.e. salt water); and a electrically-controlled valve 20a which is arranged along a hosepipe of the water supply circuit 21a and is designed to control/regulate the flow of fresh water from the water mains 13 towards regeneration-agent reservoir 26, an electrically-powered brine-circulating pump 26a which is interposed between the water-softening agent container 25 and the regeneration-agent reservoir 26 and is structured for transferring/moving the brine (i.e. the salt water) from the regeneration-agent reservoir 26 to the water-softening agent container 25 when activated.

Reference documents WO 2006 079 417 and/or EP 0 861 114 disclose an ion-removal internal water softening device comprising a flow through capacitor which comprises plates having a conductive surface. The plates are chargeable in response to an applied DC potential. The plates are separated from each other by non-conductive spacers. The plates and the conductive surface on the plates may be constructed from conductive materials such as metals, carbon or conductive polymers or combinations. Because the plates of the flow through capacitor have a limited capacity, the flow through capacitor requires regeneration, to remove the hardness ions from the flow through capacitor plates. The flow through capacitor may be regenerated by flushing with fresh water, short-circuiting the anode plates with the cathode plates or by reversing the polarity or by a combination thereof. The interval for regeneration is also dependent on the concentration of ions in the feed water; the harder the feed water, the more frequent regeneration is required. The water produced during regeneration contains a high level of hardness (ions) and is therefore directed to a waste outlet. The flow through capacitor thereby provides water softening without the addition of chemicals for regeneration.

It should in any case be understood that water softening device 18 is not limited only to ion-removal devices type, but according to other possible embodiments of the present invention, it may comprise any kind of device/apparatus operating according to known water softening technologies. In accordance with an exemplary embodiment (not illustrated), the water softening device 18 may comprise: reverse osmosis systems/devices, nano-filtration systems/devices, distillation systems/devices such as membrane distillation systems/devices, boiling systems/devices, capacitive deionization systems/devices, electro-dialysis systems/devices and similar which are known and detailed description thereof will be omitted accordingly.

As illustrated in FIGS. 1, 2, 3, 5 and 7, the laundry washing machine 1 further comprises a user control panel 28, which may be preferably, although not necessarily arranged in the front wall 2a of the casing 2 and is structured/configured to allow the user to input information being indicative of an energy saving washing course to perform. The user control panel 28 may preferably comprise, for example, a LED or LCD or fluorescent type display or the like, and/or preferably acoustic devices designed to generate vocal/acoustic messages.

The laundry washing machine 1 furthermore comprises an electronic control unit 15 which may be configured to control the heating device 11 in order to cause the water loaded/supplied in the washing tub 3 to reach an energy saving washing temperature TS depending on the softened water to be supplied during the laundry wash phase/s of the laundry washing course.

In accordance with a first embodiment shown in FIG. 3, the control panel 28 may be structured/configured to allow the user to select a laundry washing course among one or more preset energy saving laundry washing courses, i.e. energy saving cotton course, energy saving synthetic course, energy saving delicate wool course. Data relating to selectable/performable energy saving laundry washing course/s may be preferably contained in a memory device 27 or any similar apparatus cooperating with the electronic control unit 15, and may comprise information associated with the temperatures of the washing water used by energy saving washing courses. Memorized data relating to selectable/performable energy saving washing course/s may further comprise information about the kind of water (softened/fresh/mix), and/or the hardness degree of the water to be supplied during each laundry wash phases of a energy saving washing course. For example, memorized data relating to a selectable energy saving cotton course may comprise: an energy saving washing temperature TSi, information about the reduction of washing temperature ΔTSi, information about the amount of saved energy ΔEi, information that the main wash phase is a softened water wash phase, information that the first rinse phase corresponds to a softened water wash phase, information that second rinse phase corresponds to a mix water wash phase, and information that final rinse phase corresponds to a fresh water wash phase.

It should be understood that reduction of washing temperature ΔTSi may be determined for example by calculating the difference between the energy saving washing temperature TSi and a nominal washing temperature TNi, wherein the latter may correspond to a nominal temperature generally used in performing similar fresh water laundry washing course, or a medium value generally indicated in the detergent packaging.

It should be further understood that reduction of washing energy ΔEi may be determined for example by calculating the difference between the energy saving washing energy required to perform the energy saving washing course and the energy required to perform a corresponding fresh water laundry washing course.

In accordance with the first exemplary embodiment shown in FIG. 3, the water softener system 14 may be configured to provide, on command, softened water or fresh water or mix water, whereas the electronic control unit 15 may be configured to selectively activate the water softening system 14 based on the selected energy saving washing course as to supply softened water to the detergent dispensing assembly and/or the washing tub 3 during the main wash phase, and control the heating device 11 during the heating phase of the main wash phase so as to regulate the temperature of the supplied water based on the softened water and/or the hardness degree of softened water.

FIG. 4 illustrates an example of table containing on a column a number of energy saving washing courses, (energy saving washing course A, B, . . . N, N+1) which may be implemented in the machine 1. For each energy saving washing course, the table contains information relating to energy saving washing temperature TSi (TS1, TS2, . . . , TSN, TSN+1), the reduction of temperature ΔTSi (ΔTS1, ΔTS2, . . . ΔTSN, ΔTSN+1), the energy saved ΔEi (ΔE1, ΔE2, . . . ΔEN, ΔEN+1), and the kind of water (i.e. softened, mix, fresh water) to be supplied during each laundry wash phase.

As shown in FIG. 4, energy saving washing courses may be preferably configured so that: during the main wash phase, the softener system 14 is activated/controlled in the first operating state in order to provide/supply a softened water so as to perform a softened water wash phase, whereas during the wash phase following the main laundry wash phase, i.e. the rinses phases and preferably the spin phase, the softener system 14 is activated/controlled to selectively operate in the first or second or third state so as to provide softened, or fresh or mix water, respectively in order to perform softened water wash phase, or fresh water wash phase and the mix water wash phase. Preferably, one or more performable energy saving washing courses may be programmed so that the first rinse phase is a softened water wash phase.

Preferably, one or more performable energy saving washing courses may be programmed so that the first rinse phase is a softened water wash phase and the last rinse phase is a fresh water wash phase. Preferably, one performable energy saving washing course may be programmed so that all the laundry wash phases, e.g. the main wash phase and following laundry wash phases, correspond to softened water wash phases, wherein the water is heated by the heating device 11 on the basis of the energy saving temperature TS.

Preferably, a performable energy saving washing course may be programmed so that one or more, preferably all, the laundry wash phases correspond to softened water wash phases, and the loaded water is maintained, during the course, as substantially cold water. It should be understood that according to one embodiment of the present invention, the cold water of the energy saving washing course may be obtained by activating the heating device 11 for a short duration, i.e. for rising the temperature of the water of a few degrees compared to the temperature of the water provided from the water mains 13. For example, the electronic control unit 15 may be configured to activate the heating device 11 for only 10-55 seconds and temperature of the water may rise only 1-5° C., remaining substantially "cold".

According to a different embodiment the electronic control unit 15 may be advantageously configured to not perform the heating phase of the main laundry wash phase. In this case, energy saving washing course may be programmed so that main laundry wash phase does not comprise the heating phase. According to a exemplary embodiment, electronic control unit 15 may be configured to maintain the heating device 11 deactivated. I.e. switched off, during the main laundry wash phase, so that the loaded softened water remains cold during the course, as the fresh water provided by the water mains 13.

Applicant found that: the average energy consumption of a standard fresh water laundry washing cycle in full load condition (8 Kg) is about 470 Wh, whereas the average energy consumption of a energy saving washing cycle in full load condition wherein softened water having 1 FH is supplied during the main wash phase, and mix water is supplied during the following wash phases, is about 390 Wh. Therefore energy saving washing cycle may be 20%.

Applicant further found that by performing an energy saving washing course in full load condition, wherein the course comprises the steps of supplying softened water during all wash phases, the energy consumption is 280 Wh, and energy saving of 40% is reached.

Figure 5:
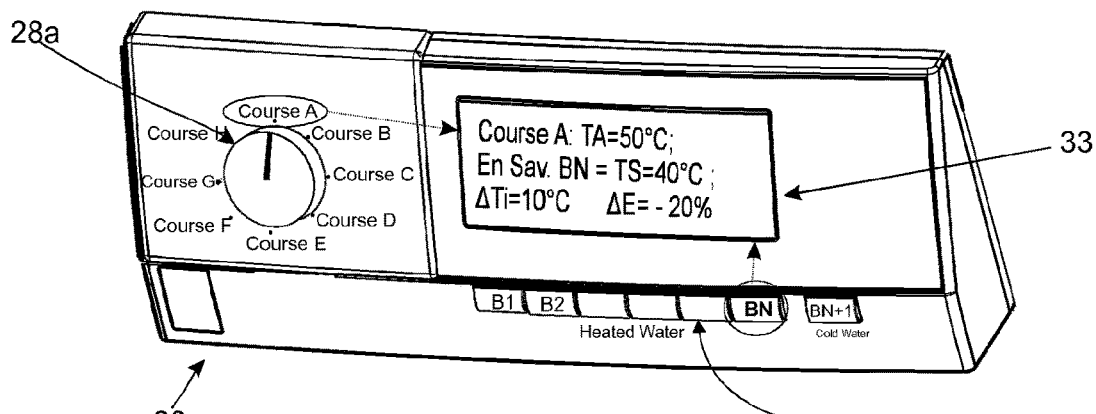
FIG. 5 schematically illustrates a second embodiment of a user control panel of the laundry washing machine illustrated in FIG. 1.

In accordance with a second embodiment shown in FIG. 5, the control panel 28 may be structured/configured to allow the user to input first information indicative of a fresh water washing course to be performed, and second information indicative of a request to perform energy saving of the selected fresh water washing course, i.e. performing selected fresh water washing course according to one or more energy saving states/levels.

Figure 6:
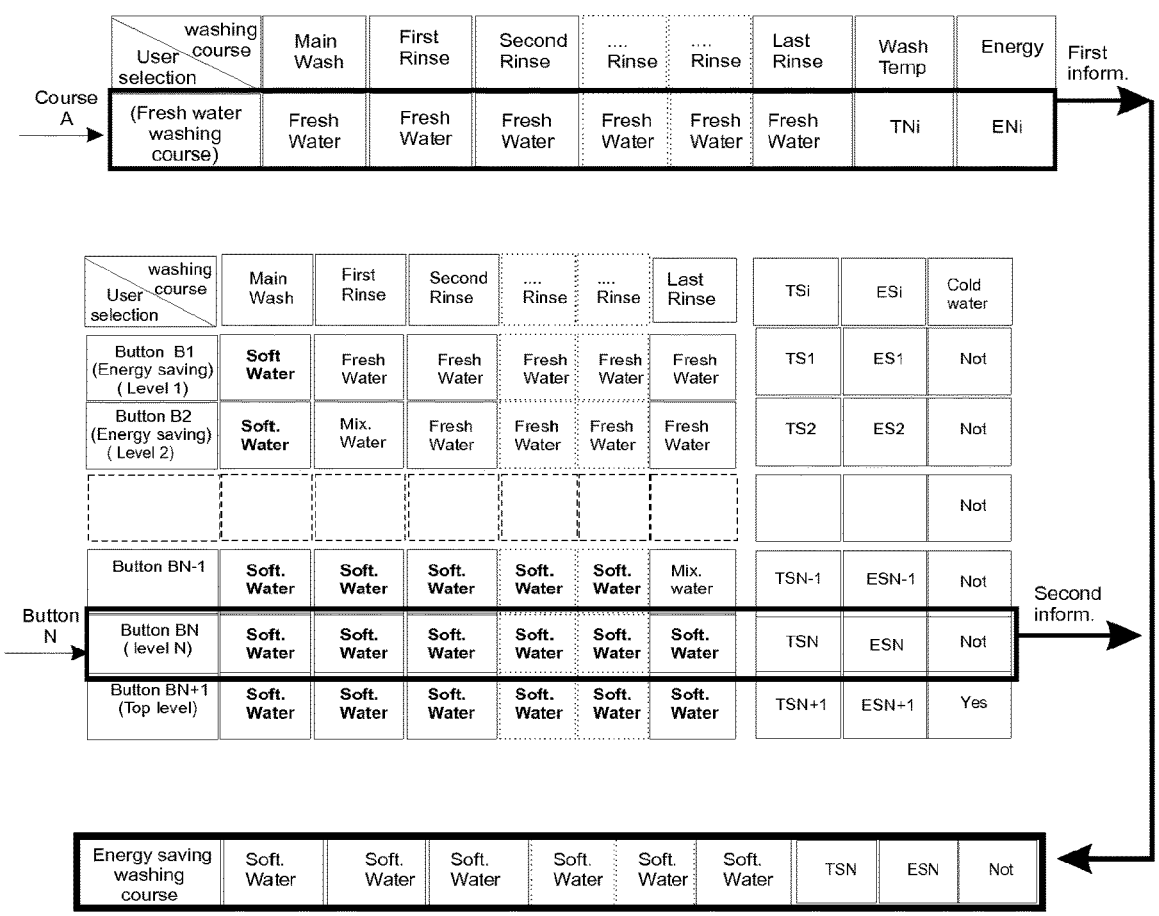
FIG. 6 shows an example of a table containing energy saving washing courses selectable by the control panel illustrated in FIG. 5.

In accordance with the exemplary embodiment shown in FIGS. 5 and 6, the control panel 28 may comprise a first select part 28a configured to allow the user to select a fresh water washing course among a plurality of fresh water washing courses; and a second select part 28b configured to allow the user to select one or more energy saving commands corresponding to energy saving states/levels that electronic control unit 15 applies to the selected fresh water washing course.

The fresh water washing courses may be contained/memorized in the memory device 27 by means of data, and be associated to a washing water temperature TNi. It should be understood that the washing water temperature TNi associated to the fresh water washing course may be a prefixed temperature, or could be a value inputted by user via the control panel 28, or a value that control panel 28 automatically displays in response to the selected washing course, or a value printed/labelled on the in view surface of the control panel 28.

In accordance with the second exemplary embodiment shown in FIGS. 5 and 6, the electronic control unit 15 may be configured to set the energy saving washing course to be performed based on the first information indicating the selected fresh water washing course and the second information relating to the selected energy saving command/state that user has selected/requested, and control the water softening system 14 based on the set energy saving washing course.

Preferably, the electronic control unit 15 may be configured to set the energy saving washing course to be performed, by reducing the hardness degree of water to be supplied during at least the main wash phase so that the fresh water is switched/replaced in/with softened water or mix water, depending on the wash phase. Preferably, the electronic control unit 15 may be further configured to set energy saving washing course to be performed, by reducing the hardness degree of water to be supplied during one or more rinse phases following the main wash phase so that the fresh water is selectively switched/replaced by the water softening system 14 in/with softened water or mix water during rinse phases.

It should be in any case understood that the electronic control unit 15 may be further configured to set energy saving washing course to be performed, wherein loading of the fresh water is maintained during one or more rinse phases, preferably the last rinse phase.

In accordance with the second exemplary embodiment shown in FIG. 5, the electronic control unit 15 is further configured to determine energy saving washing course to be performed by reducing the washing temperature from the predetermined washing temperature TNi (associated to the fresh water washing course) to an energy saving washing temperature TSi.

In accordance with the second exemplary embodiment shown in FIG. 5, the electronic control unit 15 may be further configured to activate/control the water softening system 14 (depending on the kind of softening system 14 of the machine) based on the set energy saving washing course to cause softened water to be supplied during the main wash phase or one or more rinse phase/s of the fresh water washing course, and control the heating device 11 in order to heat the softened water loaded into the washing tub 3 so that the temperature of the latter reaches the energy saving washing temperature TSi. In other words, the electronic control unit 15 may be configured to control the heating device 11 to cause the actual temperature of the softened water supplied during the main wash phase to reach the energy saving washing temperature TSi lower than the predetermined temperature TNi set for the fresh water.

Applicant performed tests to measure the energy consumed during a fresh water washing course, i.e. a full load cotton course, and energy consumed during an energy saving washing course, and compared the measured values to determine the energy saved.

More specifically, Applicant made a first test by performing a fresh water cotton course 30° C., comprising the steps of supplying only fresh water having a temperature of 30° C. during all wash phases in a full laundry load condition (8 Kg), and a second tests by performing an energy saving cotton course comprising the steps of supplying softened water having a reduced temperature of 27° C. and a reduced hardness degree of 1 FH during the main wash phase. Applicant found that energy consumption of a course performed in the first tests is about 630 Wh, whereas the energy consumption of the energy saving course performed during the second test is about 460 Wh. In such case energy saving of 25% is reached and the reached laundry cleaning ratio of the courses performed in the first and second resulted similar to each other.

Applicant further made a third test by performing performing an energy saving cotton course comprising the steps of supplying softened water having the reduced temperature of 27° C. and a hardness degree of 1 FH during all the wash phases. In such case the energy is reduced from 630 Wh to 300 Wh, and an energy saving of 50% is reached.

In a fourth test, Applicant further found that by performing an energy saving washing course, wherein softened water having a hardness degree of 1 FH is supplied during the main wash phase, and the laundry load is 8 Kg, the temperature of the water may be conveniently reduced from 60° C. to 40° C. if compared to a known fresh water washing course having a hardness degree of 25 FH. In such case, the energy is reduced from 1415 Wh to 810 Wh, energy saving of 42% is reached, and washing cleaning ratio remains unchanged compared to cleaning ratio obtained by means of a correspondent fresh water laundry washing course.

As shown in the example of FIG. 5, the first select part 28a may comprise a rotation knob for supplying the selected signal containing the first information after sensing whether a course is selected through rotation, whereas the second select part 28b may comprise one or more buttons B1, BN, BN+1 for supplying the selected signal/command containing the second information after sensing whether an energy level has been selected. It should be in any case be understood that the first select part 28a and second select part 28b are not limited to the example illustrated in FIG. 5, but could comprise other kind of known input devices such as, for example, a touch panel/s.

In the example shown in FIGS. 5 and 6, if the buttons B1, BN, BN+1 are not pushed, the electronic control unit 15 may perform the fresh water washing course selected by user via the rotation knob, so as to load the fresh water during the prefixed wash phases, and controlling the heating device 11 during the heating phase based on the predetermined temperature TNi.

When one or more buttons B1, . . . , BN, BN+1 is/are pushed, the electronic control unit 15 modifies the fresh water washing course so as to state/define the "energy saving washing course" to be performed, selectively activate/control the water softening system 14 so as to supply softened water during the main wash phase, preferably control the heating device 11 (if set in the washing course) to heat the softened water in order to reach the energy saving temperature TSi, and activate/control the water softening system 14 to selectively supply mix or softened or fresh water during the rinse phases following the main wash phase. Kind of water (mix or soft or fresh) to be supplied during the rinse phases following the main wash phase of a selected fresh water washing course, may be determined by the electronic control unit 15 on the basis of the pushed buttons B1, . . . BN, BN+1. For example, button B1 when pushed may cause the softened water to be supplied during the main wash phase instead of fresh water, and predetermined temperature TNi to be reduced according the energy saving temperature TS1; the button B2 when pushed may cause the softened water to be supplied during the first rinse (instead of fresh water), and the button BN, when pushed may cause the softened water to be supplied during the last rinse. It should be understood that the second select part 28b may be configured to allow the user to select the kind of water, i.e. fresh or softened or mix, to be supplied during the rinse phases. For example, buttons B2, . . . , BN+1 may be structured so that user may select the soft/fresh/mix based on a pushed time and/or number of repeatedly pushing of a button. It should in any case be understood that buttons of the second select part 28b may be configured to cooperate with the electronic control unit 15 in order to allow the user to select any combination of loading of the softened water in the wash phases of the energy saving washing course. For example, according to an embodiment the buttons may be configured so that pushing of the button Bi may cause loading of the softened water during all wash phases of washing course comprised between the first wash phase and the i-th wash phase. For example, user may conveniently select a fresh water washing course to be performed, for example a cotton cycle, or delicate cycle, wool cycle, and pushes a button to select the energy saving function in order to cause the selected fresh washing course to be performed as an energy saving cycle.

Figure 7:
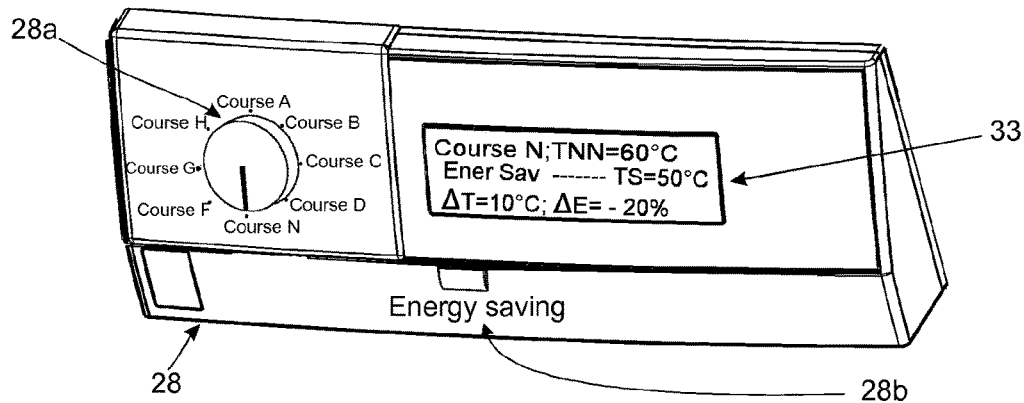
FIG. 7 schematically illustrates a third embodiment of a user control panel of the laundry washing machine illustrated in FIG. 1.
Figure 8:
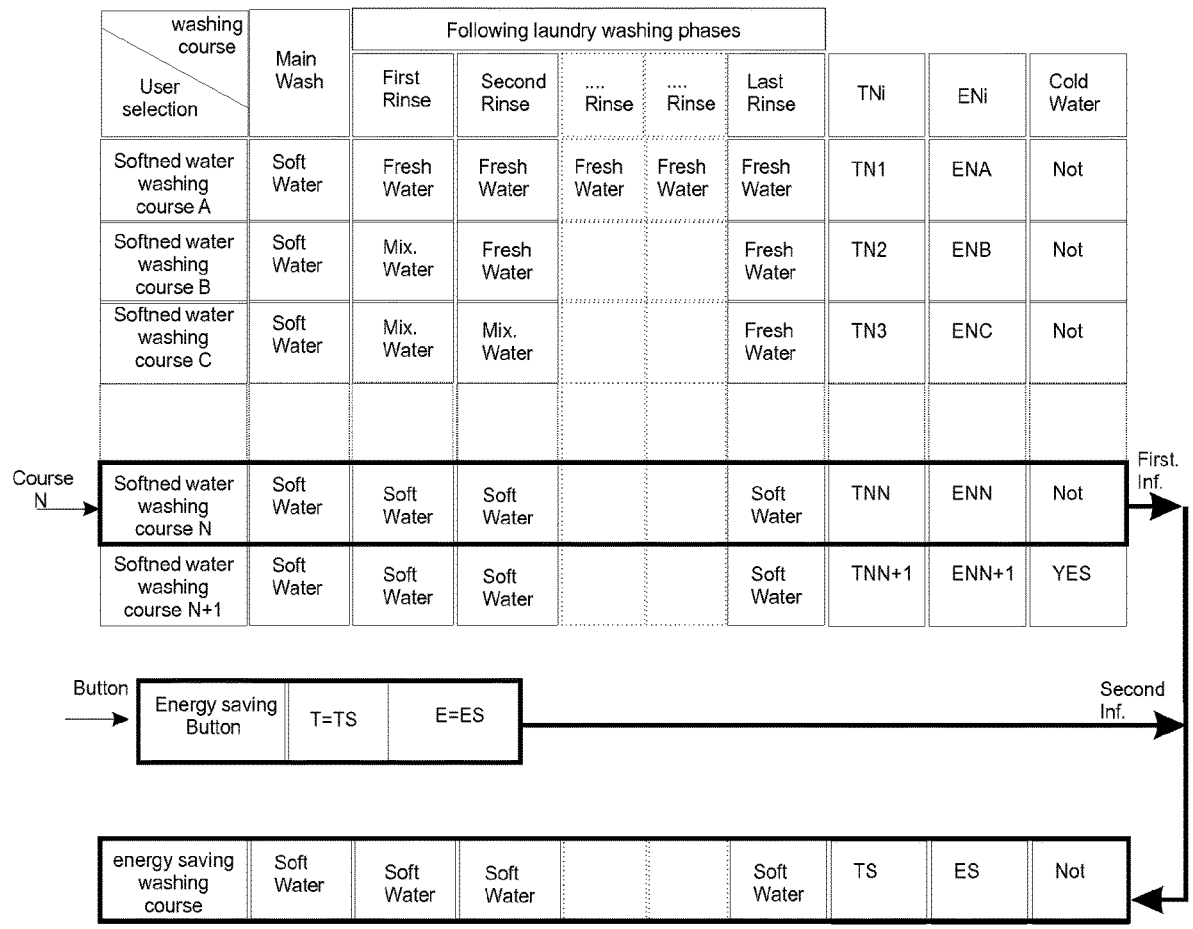
FIG. 8 shows an example of a table containing energy saving washing courses selectable by the control panel illustrated in FIG. 7.

FIGS. 7 and 8 illustrate a third exemplary embodiment which differs from the second embodiment because the first select part 28a is configured to allow the user to select a laundry washing course among a plurality of softened water washing courses, and the second select part 28b is configured to allow the user to select an energy saving command/function.

Information about softened water washing courses may be contained in memory device 27 and comprise data relating to kind of water (softened, mix and fresh water) to be supplied during the laundry wash phases, a value indicating a predetermined nominal temperature TNi, and an energy saving washing temperature TS lower than the nominal temperature TNi.

Preferably, the energy saving course set by the electronic control unit 15 comprises substantially the softened laundry washing phases of the selected softened water washing course, and the energy saving washing temperature TS is lower than the predetermined washing temperature TNi associated to the softened water washing course.

In accordance with the third exemplary embodiment shown in FIGS. 7 and 8, the electronic control unit 15 may be further configured to control the water softening system 14 based on the set energy saving washing course to cause softened water to be supplied to the detergent dispensing assembly 12 and/or the washing tub 3 during the main wash phase or one or more rinse phase/s of the fresh water washing course, and control the heating device 11 in order to heat the softened water loaded into the washing tub 3 so that the temperature of the latter reaches the energy saving washing temperature TS. In other words, the electronic control unit 15 may be configured to control the heating device 11 to cause the actual temperature of the softened water supplied during the main wash phase to reach the energy saving washing temperature TS being lower than the predetermined temperature TNi set for the softened water washing course.

As shown in the example of FIG. 7, the first select part 28a may comprise a rotation knob, whereas the second select part 28b may comprise at least one button for supplying the selected signal containing the second information. In the example shown in FIGS. 7 and 8, if the button is not pushed, the electronic control unit 15 may perform the softened water washing course selected by user, so as to load the softened water during the prefixed laundry wash phases and controlling the heating device 11 during the heating phase based on the predetermined temperature TNi so that the energy consumption is ENi.

On the contrary, when the buttons is pushed, the electronic control unit 15 modifies the softened water washing course so as to define the "energy saving washing course" to be performed, controls the water softening system 14 to supply softened water during the main wash phase, controls the heating device 11, if set on the course, to heat the softened water so as to reach the energy saving temperature TS, and controls the water softening system 14 to selectively supply mix or softened or fresh water during the following rinse phase/s.

According to a preferred embodiment of the present invention, the electronic control unit 15 may be further configured to control the temperature of the water loaded during the main wash phase by regulating the switch-on duration of the heating device 11 on the basis of the kind of supplied water (softened/fresh/mix) or the hardness degree of the washing water. In accordance with an exemplary embodiment, the lower the water hardness degree is, the less may be the water temperature and the switch-on duration of the heating device 11. For example, during the first test made by the Applicant in which the water temperature to be reached was 30° C., the switch-on duration was about 11 minutes, whereas in the second test wherein softened water of 1 f H is supplied during the main laundry wash phase, the switch-on duration was reduced at 5 minutes.

According to a possible embodiment, the electronic control unit 15 may be configured to control the temperature of the water loaded during the main wash phase by controlling an electric quantity, i.e. current/voltage supplied to the heating device 11 during the main laundry wash phase. Preferably, the electronic control unit 15 may control the current/voltage supplied to the heating device 11, i.e. resistor, based on the prefixed hardness degree of the water supplied/to be supplied during the main wash phase.

In accordance with one embodiment, selectable energy saving course may comprise heated water energy saving course using heated water, and/or cold water energy saving course using cold water. For example, the electronic control unit 15 may be further configured to perform an energy saving washing cycle corresponding to a cold washing cycle (see for example fresh water washing course N+1 in Table of FIG. 6 and softened water washing course N+1 in Table of FIG. 8), wherein it controls the softening device 18 to supply softened water to the washing tub 3, maintaining the heating device 11 completely switched-off during the whole main wash phase such that the supplied water is cold, and regulates the duration of the main wash phase according to the water hardness of the supplied cold water. In accordance with an exemplary embodiment, the duration of the main wash phase, when the heating device 11 is maintained switched-off during the main wash phase (cold washing cycle), may be in inverse proportion to the hardness degree of the softened washing water supplied during the main wash phase.

In accordance with one embodiment wherein the water softening system 14 is configured to be activated/controlled in order to regulate the hardness degree of the water, and the electronic control unit 15 may be configured to: preferably determine via the memory device 27 the prefixed hardness degrees of the water to be supplied, based on to the selected energy saving washing cycle; determine preferably, although not necessarily, by the sensor system 32, the hardness degree of the water supplied to the detergent dispensing assembly 12 or to washing tub 3; compare the determined water hardness degree with the prefixed hardness degree associated with the water supplied during a laundry wash phase; regulate the hardness degree of the fresh water supplied to detergent dispensing assembly 12 or washing tub 3 based on the comparison between measured water hardness degree and prefixed water hardness degree; control the electrically-controlled valves 19 and/or 23a and/or 23b based on the comparison between determined water hardness degree and the prefixed water hardness degree; and control the heating device 11 based on the prefixed water hardness degree by performing the operation of the control method hereinafter disclosed.

According to a preferred embodiment illustrated in the FIGS. 2, 3, 5 and 7, the electronic control unit 15 may be configured to provide the user via the control panel 28 an indication of said predetermined washing temperature TNi, and/or an indication of the energy saving washing temperature TSi, and/or an indication of the difference ΔTSi between the predetermined washing temperature TNi and the energy saving washing temperature TS.

The electronic control unit 15 may be further configured to provide the user via the control panel 28, i.e. by means of LED or LCD or fluorescent type display information associated with the energy saved ΔEi and/or with the consumed energy. For example, display may shows the energy saved information in a numeric format or graphic format, i.e. histograms or icons or similar.

Figure 9:
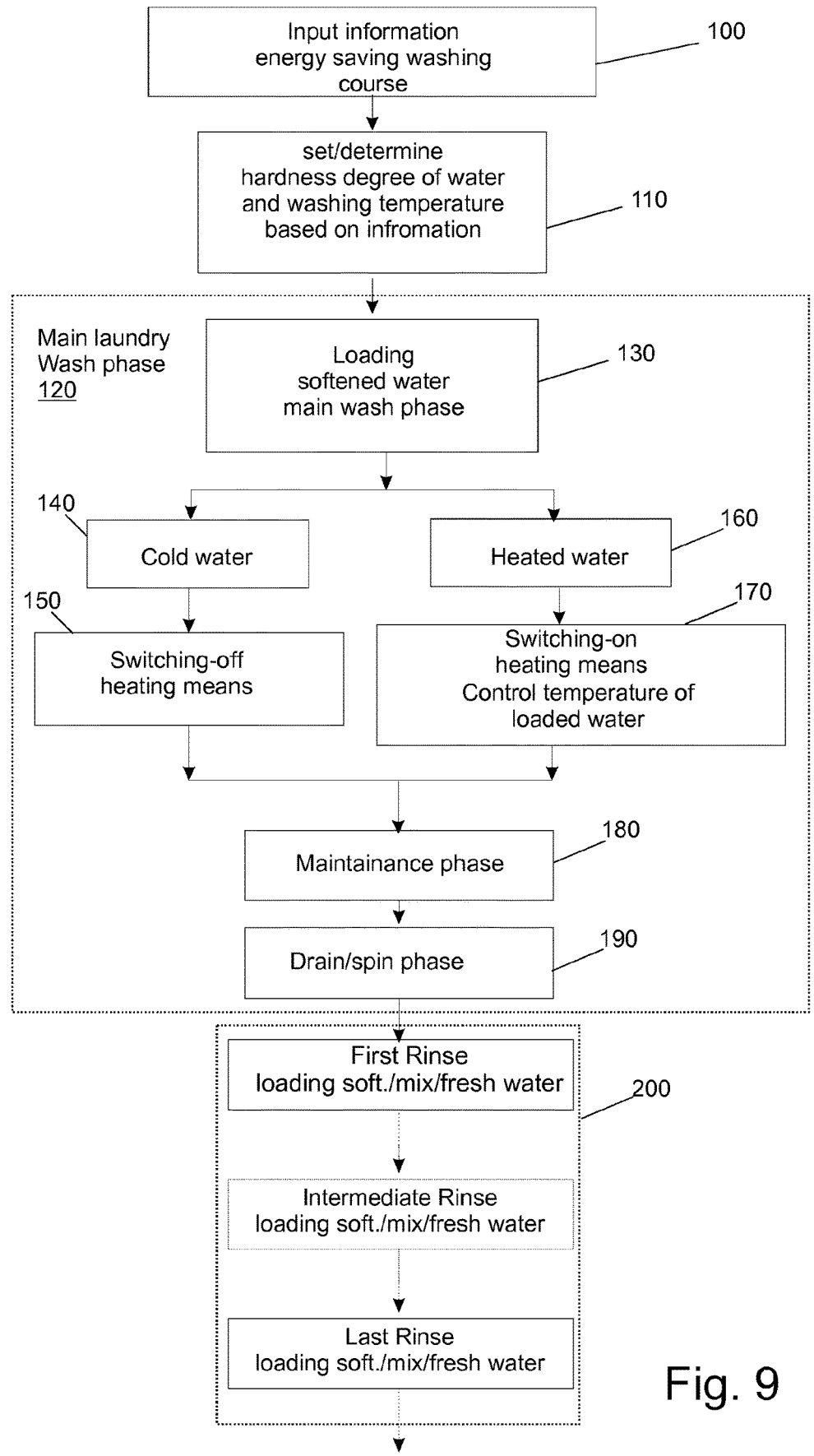
FIG. 9 is a flow chart containing the operation performed by the laundry washing machine of aspects of the present invention.

Next, the operation performed by laundry washing machine 1 according to aspects of the present invention will be explained in FIG. 9 which illustrates an outline operation flow chart.

In step 100, user inputs via the control panel 28 the information indicative of the energy saving washing course to be performed. As above disclosed, in this step user could select directly the energy saving washing course among one or more energy saving washing courses as illustrated in the example of FIGS. 1 and 3, or inputs the first and second information as illustrated in the second embodiment illustrated in FIG. 5 or in the third embodiment illustrated in FIG. 7.

In step 110, the electronic control unit 15 may determines in the memory device 27 all data/information about the kind of water (softened or mix or fresh water), and/or the prefixed hardness of the water, i.e. to be supplied during each laundry wash phase, i.e. main wash phase and the rinse phases of the selected laundry washing course, based on the set energy saving washing course and the energy saving temperature TSi. Preferably, in this step electronic control unit 15 may set the energy saving course based on first and second information inputted by the user.

After that, in step 120, electronic control unit 15 may start performing the main wash phase of the energy saving washing course. Hereinafter it will be supposed that user has selected the energy saving washing course, wherein the main wash phase is performed by using softened water, and all the rinse phases are performed by using mix water.

In step 130, main wash phase comprises the wetting step, wherein the electronic control unit 15 activates/controls the softener system 14 so as to supply a prefixed volume of softened water to the detergent dispensing system 12 to cause a prefixed amount of detergent to be flushed from the detergent dispensing system 12 into the washing tub 3. At this time, the electronic control unit 15 may preferably although not necessarily control the valves 20 and/or 23a and/or 23b so as to selectively regulate flows/volumes of fresh water crossing the hosepipes 19, 21 and 22 and passing through the water softening agent container 25, based on the amount of softened water to be supplied, and/or the hardness degree of the softened water. Preferably although not necessarily, if the laundry washing machine 1 comprises an electronic sensing system 32, the electronic control unit 15 may control the valves 20 and/or 23a and/or 23b based on a comparison between the prefixed hardness degree and the measured water hardness degree.

In one embodiment, main wash phase may comprise a drum tumbling step, wherein electronic control unit 15 controls the electric motor assembly 6 so as to rotate the drum 4 such that the laundry is tumbled/wetted and detergent is dissolved in the softened water loaded in the tub 3. In this step, the electronic control unit 15 may further control the softener system 14 in order to supply softened water directly to the washing tub 3 until a prefixed water level is reached. In one embodiment electronic control unit 15 could control the flow diverter, if present, to supply softened water directly to the washing tub 3.

After the prefixed water level is reached, the electronic control unit 15 may continue to control the rotation of the drum 4 to perform the tumbling movements of the laundry inside of the drum 4 and starts heating step wherein it controls the heating device 11 based on the supplied softened water and/or the hardness degree of the water.

In one embodiment illustrated in step 140 of the flow chart, the selected energy saving washing course is a cold water energy saving course, wherein a substantially cold soft water is loaded in the washing tub 3. Preferably, in this step the electronic control unit 15 maintains the heating device 11 substantially switched-off (step 150). Applicant has further found that by supplying cold softened water having a hardness degree of 1 FH during the main wash phase, energy consumption of the machine is about 300 Wh if compared with a correspondent fresh water washing course and more than 50% of energy saving is obtained.

It should be understood that in a different embodiment of the invention, in this step, the electronic control unit 15 may be configured to activate the heating device 11 (switching on) for a short time, to cause the temperature of the water to rise a few degrees, e.g. 2-5° C. compared to the temperature of the water provided by the water mains 13.

In one embodiment illustrated in step 160 wherein the selected energy saving washing course is a heated water energy saving course, i.e. softened water is loaded into the washing tub 3, the electronic control unit 15 switches-on the heating device 11 and in the step 170 controls the heating device 11 to cause the loaded softened water to reach the energy saving temperature TSi based on the softened water or the or hardness degree of the water.

It should be further understood that the control of temperature of the loaded water based the kind of water (softened, mix, or fresh) or the hardness degree of the softened water supplied during the main wash phase, is not limited only to the regulation of the switch-on duration or the regulation of the electric values supplied to the resistor, but other known temperature control methods may be implemented in different embodiments (not illustrated) when the heating device 11 is a steam heating device, or a hot air heating device, or a microwave device, or a infrared rays apparatus.

Next, in step 180, the electronic control unit 15 switches off the heating device 11 if the latter is on, and starts performing a maintenance phase wherein the rotation of drum 4 is controlled in order to perform the tumbling movements of the laundry inside of the drum 4.

Next, in step 190, the main wash phase performs drain step and preferably, although not necessarily, spin step. In the drain step, the electronic control unit 15 controls the water draining system 8 to drain the washing water from the washing tub 3, whereas in the spin step the electronic control unit 15 controls the motor assembly 6 so as to spin the drum 4 at high speed one or more times.

After performing the drain and spin steps, in step 200, the electronic control unit 15 performs a prefixed number of rinse phases during which the electronic control unit 15 may activate/control the water softener system 14 in order to selectively supply softened, or mix, or fresh water to the washing tub 3 according to the selected energy saving washing course.

Therefore when it is required high level of energy saving, the electronic control unit 15 may activate/control the softener system 14 to supply soft water in any rinse phase (Button BN/top level in the table illustrated in FIG. 4), whereas on the contrary, if a low level of energy saving is required (level 1 in the table illustrated in FIG. 4), the electronic control unit 15 may control the softener system 14 to supply mix or fresh water during the rinse phases.

In accordance with one embodiment, rinse phases performed after the main wash phase may comprise the step to selectively supplying a soft or mix or fresh water to the washing tub 3 preferably, although not necessarily, through a main wash compartment (not illustrated) of the detergent dispensing assembly 12. The first rinse phase may also comprise a rinse maintenance step, wherein the electronic control unit 15 controls the motor assembly 6 in order to rotate the drum 4 so that the laundry is tumbled inside the drum 4, and a drain and spin step wherein the rinse water is removed from the laundry.

It has thus been shown that the present invention allows all the set objects to be achieved. In particular the present invention specifically performs an energy saving without however affecting the laundry washing performances.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. Laundry washing machine comprising:
    an outer casing,
    a washing tub, which is arranged inside the casing,
    a rotatable drum, which is arranged in axially rotating manner inside the washing tub and is designed to receive laundry to be washed,
    a detergent dispensing assembly, which is designed for supplying detergent/water into the washing tub,
    a water softening system, which is designed to receive fresh water from a water mains and is configured to reduce the hardness degree of the fresh water in order to supply softened water to the detergent dispensing assembly and/or to the washing tub during one or more softened water laundry wash phases, and
    heating means designed to heat the water loaded in the washing tub so as to regulate the temperature of the loaded water,
    the laundry washing machine further comprising:
        a control panel configured to allow operator to input information indicative of:
            a fresh water washing course to be performed, the fresh water washing course including at least one washing phase and at least one rinsing phase, and
            an energy level to be performed, the energy level including one or more softened water laundry wash phases and a water temperature associated with the one or more softened water laundry wash phases, and
        a controller configured to:
            produce an energy savings washing course by combining the fresh water washing course and the energy level, and
            control said heating means to regulate the temperature of the water loaded in the washing tub based on the energy savings washing course.

2. Laundry washing machine according to claim 1, wherein said laundry washing course further comprises one or more fresh water laundry wash phase/s, wherein fresh water is supplied to detergent dispensing assembly and/or to the washing tub;
    said controller being configured to control said heating means to regulate the temperature of the water loaded in the washing tub based on the softened water laundry wash phase/s and the fresh water laundry wash phase/s of the laundry washing course.

3. Laundry washing machine according to claim 1, wherein said laundry washing course further comprises one or more mix water laundry wash phase/s, wherein a mixture of fresh water and softened water is supplied to detergent dispensing assembly and/or to the washing tub;
    said controller being configured to control said heating means to regulate the temperature of the water loaded in the washing tub based on the softened water laundry wash phase/s and the mix water laundry wash phase/s of the laundry washing course to be performed.

4. Laundry washing machine according to claim 2, wherein said controller is configured to control said heating means to regulate the temperature of the water loaded in the washing tub based on the softened water laundry wash phase/s, the mix water laundry wash phase/s, and the fresh water wash phase/s of said laundry washing course to be performed.

5. Laundry washing machine according to claim 1, wherein said washing course comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

6. Laundry washing machine according to claim 1, wherein said control panel is configured to allow operator to select a washing course among one or more of predetermined energy saving washing courses, wherein each selectable energy saving washing course comprises one or more softened water laundry wash phase/s.

7. Laundry washing machine according to claim 6, comprising memory means
containing data relating to one or more energy saving washing courses, said memorized data being indicative of loading of softened water, or fresh water, or mix water to the detergent dispensing assembly and/or the washing tub during laundry washing phases of energy saving washing courses, and being associated with an energy saving washing temperature (TSi);
said controller being configured to:
selectively activate said water softening system based on the selected energy saving washing course so as to supply softened water to the detergent dispensing assembly and/or the washing tub during at least said main laundry wash phase, and
control said heating means to regulate the actual temperature of the supplied water based on said energy saving washing temperature (TSi).

8. Laundry washing machine according to claim 1, wherein said control panel comprises:
a first select part configured to allow operator to input first information indicative of said laundry washing course;
a second select part configured to allow operator to input second information indicative of one or more energy saving commands;
said controller being configured to determine/set an energy saving washing course based on received first and second information, said energy saving washing course comprises one or more softened water laundry wash phase/s.

9. Laundry washing machine according to claim 8, wherein
said first select part is configured to allow operator to select a laundry washing course among one or more fresh water laundry washing courses, a freshwater laundry washing course comprising only fresh water wash phases and being associated to a washing temperature (TNi);
said second select part being configured to allow operator to input said second information indicative of one or more energy saving commands associated to respective energy saving levels;
said controller being further configured to
set/determine said energy saving laundry washing course based on selected fresh water laundry washing course and said energy saving commands,
control said water softening system in response to the set energy saving washing course to supply softened water during at least the main laundry wash phase and/or during one or more of the secondary laundry wash phase/s; and
control the heating means to cause the actual temperature of the softened water loaded in the washing tub during the main laundry wash phase to reach an energy saving washing temperature (TSi) lower than said predetermined temperature (TNi) of said selected fresh water washing course.

10. Laundry washing machine according to claim 9, wherein said controller is configured to set the energy saving laundry washing course by replacing one or more fresh water wash phases of said selected fresh water laundry washing course, with respective softened water laundry wash phases and/or mix water laundry wash phases, in response to said energy saving commands.

11. Laundry washing machine according to claim 8, wherein
said first select part is configured to allow operator to select a water laundry washing course among one or more softened water laundry washing courses; said softened water laundry washing course comprising one or more softened water laundry wash phases and being associated to a washing temperature (TNi);
said second select part being configured to allow operator to input said second information indicative of at least an energy saving command;
said controller being configured to set/determine an energy saving laundry washing course based on the selected softened water laundry washing course and said energy saving command,
control said water softening system in response to said set energy saving washing course to supply softened water during at least the main wash phase and/or during one or more of said secondary laundry wash phase/s; and
control the heating means to cause the actual temperature of the softened water loaded in the washing tub during the main wash phase to reach an energy saving temperature (TSi) lower than said predetermined temperature (TNi) of said selected softened water laundry washing course.

12. Laundry washing machine according to claim 1, wherein the control panel is configured to provide operator with at least one of the following:
an indication of said predetermined washing temperature (TNi);
an indication of the energy saving washing temperature (TSi);
an indication of the difference (ATSi) between said predetermined washing temperature (TNi) and said energy saving washing temperature (TSi);
an indication of the energy saved (ΔTEi) and/or the energy consumption (Ei).

13. Laundry washing machine according to claim 1, comprising: electronic sensing means configured to determine the hardness degree of the water supplied into the washing tub;
said controller being configured to control said heating means to regulate the temperature of the water loaded in the washing tub based on said determined hardness degree.

14. Laundry washing machine according to claim 13, wherein said controller is configured to control said water softening system in order to regulate the hardness degree of the softened water based on said determined hardness degree.

15. Laundry washing machine according to claim 1, wherein said information are indicative of an energy saving washing course to be performed, wherein the energy saving washing course comprises one or more softened water laundry wash phase; said controller being configured to activate said water softening system in response to said energy saving washing course so as to supply softened water to the detergent dispensing assembly and/or the washing tub during said main laundry wash phase and/or during one or more secondary laundry wash phases, control said heating means to cause the supplied softened water to substantially be/remain cold water.

16. Laundry washing machine according to claim 15, wherein said controller is configured to maintain switched-off said heating means during said main laundry wash phase so that the softened water loaded into the washing tub is not heated.

17. Laundry washing machine according to claim 15, wherein said controller is configured to switch-on said heating means during said main laundry wash phase for prefixed short time to cause the temperature of the softened water loaded into the washing tub to rise few degrees compared to the temperature of fresh water provided by said water mains.

18. Laundry washing machine according to claim 1, wherein softened water has a reduced hardness degree which is lower than about 15 FH.

19. Laundry washing machine according to claim 1, wherein softened water has a reduced hardness degree which is lower or equal than about 5 FH.

20. Laundry washing machine according to claim 1, wherein softened water has a reduced hardness degree which is lower or equal than about 2 FH.

21. Laundry washing machine according to claim 1, wherein softened water has a reduced hardness degree which is lower or equal than about 1 FH.

22. Laundry washing machine according to claim 1, wherein mix water has a reduced hardness degree which is greater than, or equal to about 15 FH, and lower than, or equal to about 25 FH.

23. Laundry washing machine according to claim 1, wherein said main laundry wash phase comprises a softened water laundry wash phase; each secondary laundry wash phase comprises: a softened water laundry wash phase or a fresh water laundry wash phase or a mix water laundry wash phase.

24. Laundry washing machine according to claim 1, wherein said water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

25. Laundry washing machine according to claim 1, wherein water softening system comprises at least a flow through capacitor.

26. A method for controlling a laundry washing machine, the laundry washing machine comprising an outer casing, a washing tub, which is arranged inside the casing, a rotatable drum, which is arranged in axially rotating manner inside the washing tub and is designed to receive laundry to be washed, a detergent dispensing assembly, which is designed for supplying detergent/water into the washing tub, a water softening system, which is designed to receive fresh water from a water mains and is configured to reduce the hardness degree of the fresh water in order to supply softened water to the detergent dispensing assembly and/or to the washing tub during one or more softened water laundry wash phases, heating means designed to heat the water loaded in the washing tub so as to regulate the temperature of the loaded water, a controller and a control panel, the method comprising the steps of:

receiving, via the control panel, input information input from the operator, the input information indicative of:
a fresh water washing course to be performed, the fresh water washing course including at least one washing phase and at least one rinsing phase, and an energy level to be performed, the energy level including one or more softened water laundry wash phases and a water temperature associated with the one or more softened water laundry wash phases;

producing, by the controller, an energy savings washing course by combining the fresh water washing course and the energy level; and controlling, by the controller, said heating means to regulate the temperature of the water loaded in the washing tub based on the energy savings washing course.

* * * * *